(12) United States Patent
Ojiro

(10) Patent No.: US 10,480,821 B2
(45) Date of Patent: Nov. 19, 2019

(54) WATER HEATER

(71) Applicant: Rinnai Corporation, Nagoya-shi, Aichi (JP)

(72) Inventor: Takashi Ojiro, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 0 days.

(21) Appl. No.: 15/580,712

(22) PCT Filed: Jun. 21, 2016

(86) PCT No.: PCT/JP2016/068401
§ 371 (c)(1),
(2) Date: Dec. 8, 2017

(87) PCT Pub. No.: WO2017/006758
PCT Pub. Date: Jan. 12, 2017

(65) Prior Publication Data
US 2018/0187921 A1 Jul. 5, 2018

(30) Foreign Application Priority Data

Jul. 9, 2015 (JP) .................................. 2015-137527

(51) Int. Cl.
*F24H 8/00* (2006.01)
*F23K 5/00* (2006.01)
(Continued)

(52) U.S. Cl.
CPC .............. *F24H 8/006* (2013.01); *F16L 55/00* (2013.01); *F23D 14/825* (2013.01); *F23K 5/00* (2013.01);
(Continued)

(58) Field of Classification Search
CPC ..... F16L 55/00; F23K 5/00; F23L 5/02; F23L 13/02; F24H 1/145; F24H 8/006;
(Continued)

(56) References Cited

U.S. PATENT DOCUMENTS

| 4,274,436 A  * | 6/1981 | Smith ..................... F16K 15/03 |
|---|---|---|
|  |  | 137/375 |
| 7,874,307 B1 * | 1/2011 | Deocampo ............ F16K 15/033 |
|  |  | 137/15.09 |
| 2011/0017316 A1* | 1/2011 | Kelly ..................... F16K 15/03 |
|  |  | 137/215 |

FOREIGN PATENT DOCUMENTS

CN 201027970 2/2008
EP 1035376 A1 * 9/2000
(Continued)

OTHER PUBLICATIONS

International Preliminary Report on Patentability for International Application No. PCT/JP2016/068401 dated Jan. 18, 2018, 6 Pages.
(Continued)

*Primary Examiner* — Steven B McAllister
*Assistant Examiner* — Benjamin W Johnson
(74) *Attorney, Agent, or Firm* — Amin, Turocy & Watson LLP

(57) ABSTRACT

A water heater includes a vessel (20) provided with a burner (3) having a downward combustion surface, a fan casing (10) accommodating a fan (10*a*) for supplying a mixture gas of primary combustion air and fuel gas to the burner, an annular packing connecting a first connection end surface at a downstream end of a first passage forming a downstream-side passage of the fan casing with a second connection end surface at an upstream end of a second passage forming an upstream-side passage of the vessel in airtight state, and a check valve (5) disposed near the upstream end in the second passage (2).

10 Claims, 10 Drawing Sheets

(51) Int. Cl.
*F16L 55/00* (2006.01)
*F23L 5/02* (2006.01)
*F24H 1/14* (2006.01)
*F23L 13/02* (2006.01)
*F24H 9/20* (2006.01)
*F23D 14/82* (2006.01)
*F24H 9/18* (2006.01)

(52) U.S. Cl.
CPC ............... *F23L 5/02* (2013.01); *F23L 13/02* (2013.01); *F24H 1/145* (2013.01); *F24H 9/2042* (2013.01); *F23D 2209/10* (2013.01); *F24H 9/1836* (2013.01); *Y02B 30/106* (2013.01)

(58) Field of Classification Search
CPC ... F24H 9/2042; F24H 9/1836; Y02B 30/106; F23D 14/825; F23D 2209/10
USPC ....................................................... 122/18.4
See application file for complete search history.

(56) References Cited

FOREIGN PATENT DOCUMENTS

| | | |
|---|---|---|
| JP | 2002-031333 | 1/2002 |
| JP | 2005-155965 | 6/2005 |
| JP | 2006-200827 | 8/2006 |
| JP | 2013-234821 | 11/2013 |

OTHER PUBLICATIONS

International Search Report for International Application No. PCT/JP2016/068401 dated Sep. 13, 2016, 3 pages.

Written Opinion for International Application No. PCT/JP2016/068401 dated Sep. 13, 2016, 3 pages.

\* cited by examiner

PRIOR ART

PRIOR ART

WATER HEATER

FIELD OF THE INVENTION

The present invention relates to a water heater. Especially, the present invention relates to the water heater having an all primary combustion type burner.

BACKGROUND ART

FIG. 9 is a schematic diagram illustrating a latent heat recovery type-gas water heater provided with a sensible heat recovery type-primary heat exchanger (311) and a latent heat recovery type-secondary heat exchanger (321) disposed in this order below a combustion surface (30a) of an all primary air combustion type burner (3a). In the water heater, all the air taken in through an air supply passage (43) by rotating a fan (not shown) in a fan casing (41) is fed as primary combustion air to a mixing device (42) and the air is mixed with fuel gas supplied through a gas supply passage (44) in the mixing device (42). Subsequently, a mixture gas obtained by mixing is fed to a reverse-combustion type burner (3a) in such a manner that the combustion surface (30a) is disposed facedown.

In the water heater describe above, since the combustion surface (30a) of the burner (3a) is disposed facedown, during a hot-water supply operation, combustion exhaust gas is ejected downward together with flames of the burner (3a) by airflow of the fan. The primary heat exchanger (311) recovers sensible heat when the combustion exhaust gas is fed to the primary heat exchanger (311), and the secondary heat exchanger (321) recovers latent heat when the combustion exhaust gas is fed to the secondary heat exchanger (321). Then, the combustion exhaust gas is discharged outside the water heater from an exhaust port (351) through an exhaust duct (341). Further, part of the combustion exhaust gas recovered the latent heat by the secondary heat exchanger (321) condenses into acid drain to remain in the secondary heat exchanger (321).

In the water heater described above, when combustion of the burner (3a) is turned off by a stop of the hot-water supply operation, the air flow of the fan stops. In this condition, since the burner (3a) is disposed above the heat exchangers (311) and (321), the acid drain remaining in the latent heat recovery type-secondary heat exchanger (321) disposed below the burner (3a) evaporates to generate acid vapor, which ascends in a vessel (40). Thus, the acid vapor may flow beyond the burner (3a) and into the fan casing (41) and the mixing device (42). As a result, if the acid vapor condenses in those members, the blades of the fan rust in the fan casing (41) and the mixing device (42) corrodes.

It is considered to dispose a check valve (4) as a backflow preventing member between the vessel (40) provided with the burner (3a) and the fan casing (41) accommodating the fan in such a manner that the acid vapor does not reach upstream of the burner (3a) when the fan stops.

When the fan rotates, the mixture gas obtained by mixing the air and the fuel gas in the mixing device (42) is fed to the vessel (40) provided with the burner (3a) through the check valve (4). On the other hand, by disposing the check valve (4) between the vessel (40) and the fan casing (41), when the fan stops, the acid vapor generated in and ascending from the vessel (40) is blocked by the check valve (4), whereby the flow of the acid vapor into the upstream fan casing (41) and mixing device (42) can be prevented.

For example, as shown in FIG. 10, the check valve (4) is disposed between an upstream connecting pipe (40a) of the vessel (40) and a downstream connecting pipe (41a) of the fan casing (41) connecting thereto for convenience in maintenance. Preferably, the check valve (4) is provided in the vicinity of an open end of either the upstream connecting pipe (40a) or the downstream connecting pipe (41a).

FIG. 10 is a partial enlarged cross-sectional view showing a connection state of passages. As shown in FIG. 10, when the check valve (4) is accommodated in the upstream connecting pipe (40a) of the vessel (40), an annular sealing packing (45) is disposed between opposite connection end surfaces of the connecting pipes (40a) and (41a) to prevent leakage from a connected portion of the upstream connecting pipe (40a) of the vessel (40) and the downstream connecting pipe (41a) of the fan casing (41).

Moreover, if the leakage from a gap between an outer surface of the check valve (4) and an inner surface of the upstream connecting pipe (40a) of the vessel (40) occurs, function as the check valve may be impaired. In order to prevent the leakage from the inner surface, an O-ring (46) is fitted onto the check valve (4). Not only the vessel (40) and the fan casing (41) are connected in airtight state, but the leakage from the gap between the inner surface of the upstream connecting pipe (40a) of the vessel (40) and the outer surface of the check valve (4) is prevented, by these two sealing members of the sealing packing (45) and the O-ring (46).

On the other hand, it is necessary for the all primary air combustion type burner (3a) to supply the mixture gas of the air and the fuel gas into the vessel (40) by the fan. Thus, when the all primary air combustion type burner (3a) is used, load on the fan is higher than that of a Bunsen burner. Therefore, it is desirable that flow resistance in the passage from the fan to the burner (3a) in the vessel (40) via the downstream connecting pipe (41a) of the fan casing (41) and the upstream connecting pipe (40a) of the vessel (40) is as low as possible.

However, in a case where the check valve (4) onto which the O-ring (46) is fitted is disposed in the upstream connecting pipe (40a) of the vessel (40) as described above, the passage will be narrowed and the flow resistance will be increased. In addition, the water heater described above requires the two sealing members of the sealing packing (45) and the O-ring (46) to keep airtightness between the upstream connecting pipe (40a) of the vessel (40) and the downstream connecting pipe (41a) of the fan casing (41). Accordingly, a number of components increases, which results in complicating an assemble work.

PRIOR ARTS

[Patent Document 1] Japanese Unexamined Patent Publication No. 2013-234821 A

SUMMARY OF THE INVENTION

The present invention has been made to solve the problems described above, and an object of the present invention is to ensure a wide passage area of a passage from a fan casing to a vessel in a water heater including an all primary air combustion type burner and a backflow preventing member that is disposed between the vessel provided with the burner and the fan casing accommodating a fan to prevent acid vapor from flowing upstream of the burner, thereby reducing flow resistance and keeping airtightness between the vessel and the fan casing with a smaller number of components.

According to the present invention, there is provided a water heater, comprising:

a vessel provided with a burner having a downward combustion surface;

a fan casing accommodating a fan for supplying a mixture gas of primary combustion air and fuel gas to the burner, the fan casing being in communication with the vessel;

an annular packing connecting a first connection end surface at a downstream end of a first passage forming a downstream-side passage of the fan casing with a second connection end surface at an upstream end of a second passage forming a upstream-side passage of the vessel in airtight state; and a check valve disposed near the upstream end in the second passage, wherein the check valve includes a flange portion extending outward around an entire circumference of an upstream open end thereof, at least one of the first connection end surface and the second connection end surface includes a first step portion configured to allow the annular packing to be fitted thereinto, the second connection end surface includes a second step portion configured to allow the flange portion of the check valve to be fitted thereinto, and the annular packing has an outer circumferential edge larger than a periphery of the flange portion of the check valve and an inner circumferential edge smaller than the periphery of the flange portion.

According to the present invention, in a case where the water heater includes the burner having the downward combustion surface and the check valve disposed between the vessel and the fan casing to prevent backflow of the acid vapor from the vessel to the fan casing after combustion of the burner is turned off, the single annular packing can prevent not only leakage from a gap between the first connection end surface and the second connection end surface but leakage from a gap between the second passage and the check valve. Therefore, according to the present invention, it is possible to reduce a number of components, as compared to that of a water heater having two sealing members of a sealing packing disposed between the connection end surfaces and an O-ring fitted onto an outer surface of the check valve and to simplify an assemble work.

Further, according to the present invention, since the O-ring is not fitted onto the outer surface of the check valve, it is possible to prevent the second passage from being narrowed and to enlarge a passage area of the passage flowing the mixture gas therein, as compared to the water heater including the check valve onto which the O-ring is fitted is accommodated in the second passage at a vessel side. Thereby, the flow resistance in the passage from the fan casing to the vessel can be reduced. Therefore, according to the present invention, even in a case where the water heater uses the all primary air combustion type burner to which the mixture gas having high load on the fan is supplied, as compared to a Bunsen burner to which air is only supplied, it is possible to supply the mixture gas from the fan casing to the burner accommodated in the vessel smoothly.

Other objects, features and advantages of the present invention will become more fully understood from the detailed description given hereinbelow and the accompanying drawings.

DESCRIPTION OF EMBODIMENTS

Hereinafter, referring to drawings, a water heater according to embodiments of the present invention will be described in detail.

Figure 1:
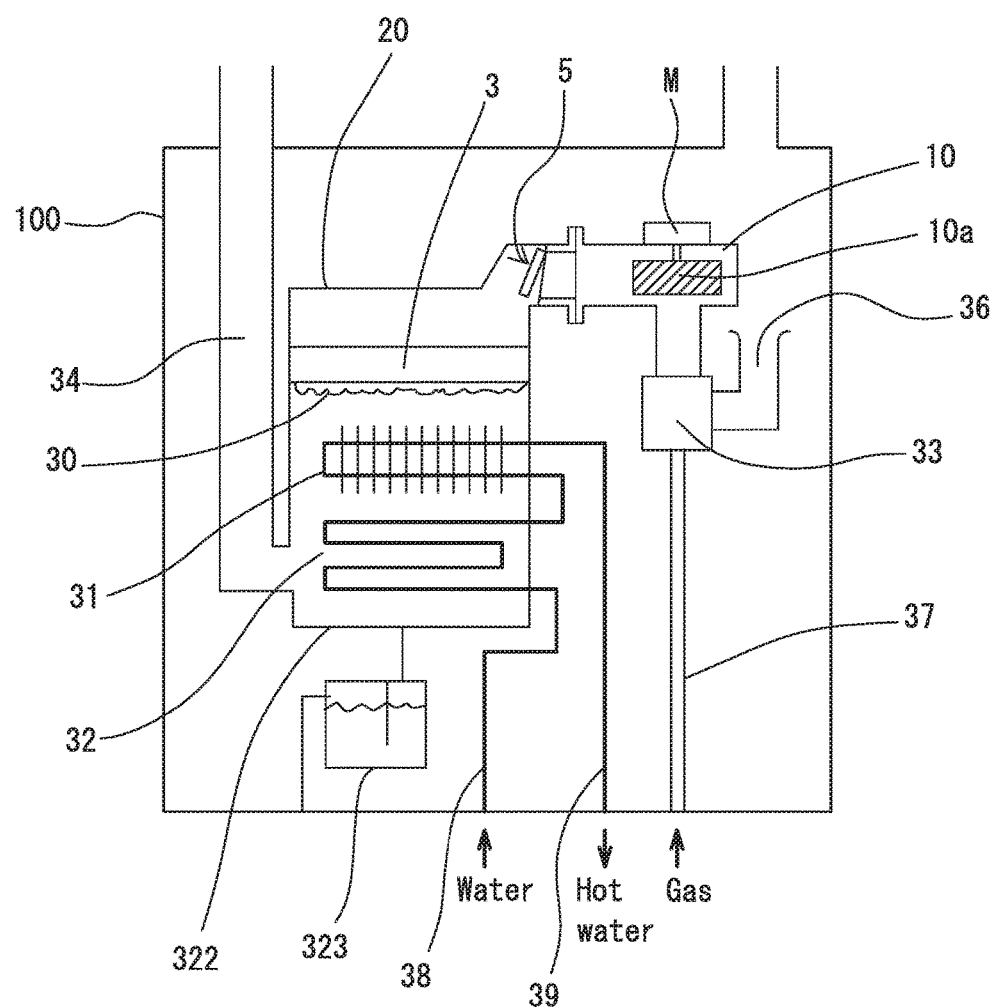
FIG. 1 is a schematic view showing a water heater according to a first embodiment of the present invention.

FIG. 1 is a schematic view of a latent heat recovery type-gas water heater having an all primary air combustion type burner (3) according to a first embodiment. Inside a casing (100), a vessel (20) provided with a burner (3) having a downward combustion surface (30) and a fan casing (10) in communication therewith are provided. Inside the fan casing (10), a fan (10a) for supplying a mixture gas of air and fuel gas to the burner (3) in the vessel (20) is accommodated. In the present specification, following a passage formed by rotation of the fan (10), the side of the fan casing (10) is referred to as an upstream side and the side of the vessel (20) is referred to as a downstream side.

First and second heat exchangers (31) and (32) for supplying hot water that are heated by combustion exhaust gas from the burner (3) are disposed below the burner (3) in the vessel (20). A mixing device (33) for mixing the air with the fuel gas is connected to an upstream side of the fan casing (10). The mixing device (33) is in communication with an air supply passage (36) for supplying the air and a gas supply passage (37) for supplying the fuel gas.

The burner (3) is of the all primary air combustion type and includes a ceramic combustion plate having many flame ports opening downwardly (not shown) or a combustion mat made by knitting metal fabric woven like a net, for example. The burner (3) has the downward combustion surface (30) and burns the mixture gas obtained by mixing all air as primary combustion air supplied from the air supply passage (36) into the mixing device (33) and the fuel gas supplied from the gas supply passage (37) into the mixing device (33). Amounts of the air and the fuel gas in the mixture gas produced in the mixing device (33) are adjusted by changing a rotation speed of a motor (M) for rotating the fan (10a).

The first heat exchanger (31) is of a sensible heat recovery type and is disposed in an intermediate portion of the vessel (20), and the second heat exchanger (32) is of a latent heat recovery type and is continuously connected to a bottom part of the first heat exchanger (31). As shown in FIG. 1, an upstream water supply pipe (38) is connected to the second heat exchanger (32), and a downstream hot-water supply pipe (39) is connected to the first heat exchanger (31). Thus, the water supplied through the water supply pipe (38) is heated by latent heat of the combustion exhaust gas from the burner (3) in the second heat exchanger (32) and then heated by sensible heat of the combustion exhaust gas in the first heat exchanger (31) to be discharged as the hot water at a predetermined temperature from a hot-water supply pipe (39).

The combustion exhaust gas passing through the second heat exchanger (32) is discharged outside the casing (100) through an exhaust duct (34). Drain generated in the second heat exchanger (32) is recovered by a drain receiver (322) to be discharged to the outside after neutralized by a neutralizer (323).

In the water heater, since the combustion exhaust gas is ejected downward from the burner (3) and the first and second heat exchangers (31) and (32) are disposed below the burner (3), acid vapor generated by evaporating the drain ascends from the second heat exchanger (32) in the vessel (20) when the fan stops after combustion of the burner (3) is turned off. Thus, a check valve (5) is disposed as a backflow preventing member between the vessel (20) and the fan casing (10) in such a manner that the acid vapor does not flow back from the vessel (20) to the fan casing (10) and the mixing device (33).

Figure 2:
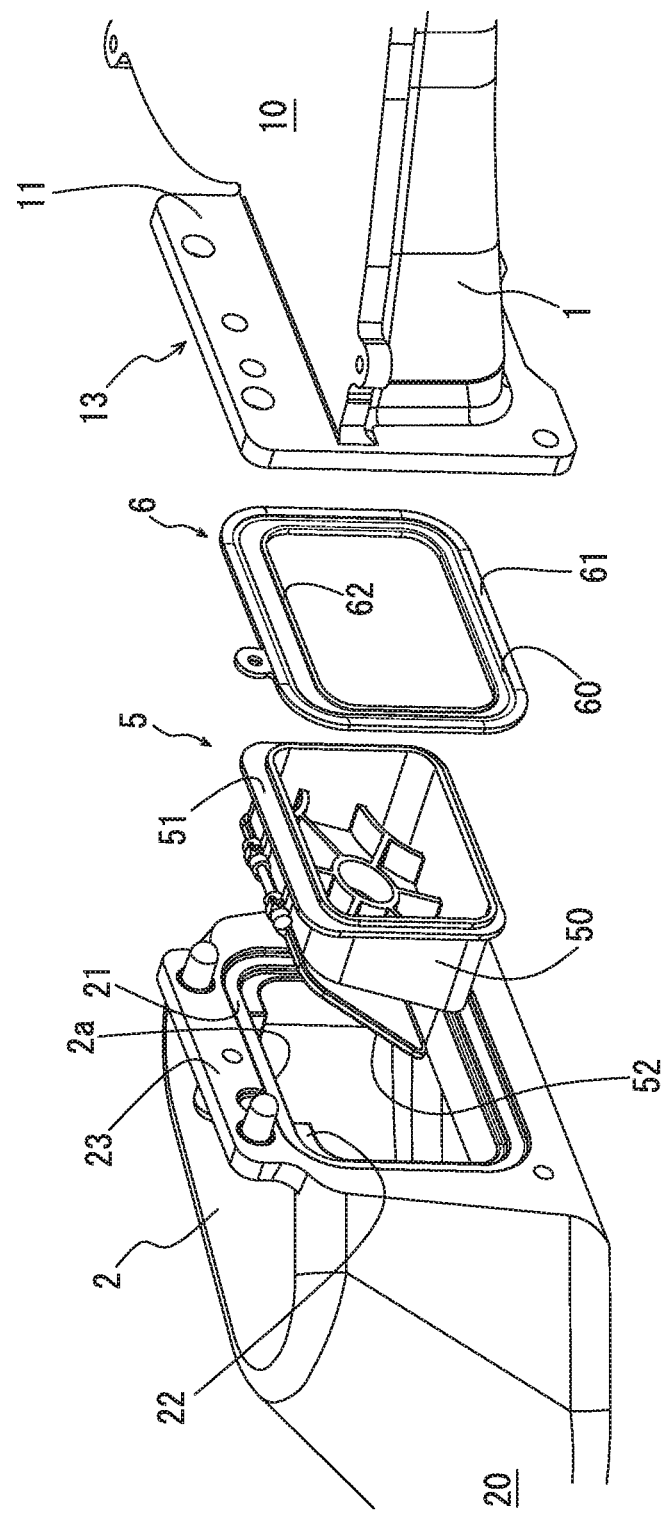
FIG. 2 is a partial enlarged exploded perspective view showing the water heater according to the first embodiment of the present invention.

As shown in FIG. 2, the fan casing (10) is connected in communication with the vessel (20) by connecting, using a coupling member (not shown), a first connection end surface (13) of a substantially rectangular flange (11) extending outward around a substantially rectangular open end of a first passage (1) following downstream of the fan casing (10) with a second connection end surface (23) formed around a substantially rectangular open end (2a) of a second passage (2) following upstream of the vessel (20).

The check valve (5) is accommodated in the second passage (2). The check valve (5) includes a substantially rectangular cylindrical casing body (50) having a size and a shape exactly fitted into the second passage (2), a substantially rectangular flange portion (51) extending outward around an upstream end edge of the casing body (50), and a flap (52) that is disposed downstream of the casing body (50) and only opens to the downstream side by the flow of the mixture gas from the upstream side. Further, a projection portion projecting from the flange portion (51) to the upstream side is formed between an circumferential edge of an upstream opening of the casing body (50) and the flange portion (51), so that an inner circumferential edge of an annular packing (6) is positioned by the projection portion.

The second connection end surface (23) of the second passage (2) includes a second step portion (22) having a size and a shape into which the flange portion (51) can be exactly fitted, when the casing body (50) of the check valve (5) is inserted in the second passage (2) from the substantially rectangular open end (2a) of the second passage (2).

The annular packing (6) is interposed between the first connection end surface (13) of the fan casing (10) and the second connection end surface (23) of the vessel (20) at which the flange portion (51) of the check valve (5) is exposed.

The annular packing (6) has a substantially rectangular annular body. The annular packing (6) has an inner circumferential edge larger than the upstream opening of the casing body (50) but smaller than a periphery of the flange portion (51), and an outer circumferential edge larger than the periphery of the flange portion (51).

Figure 3:
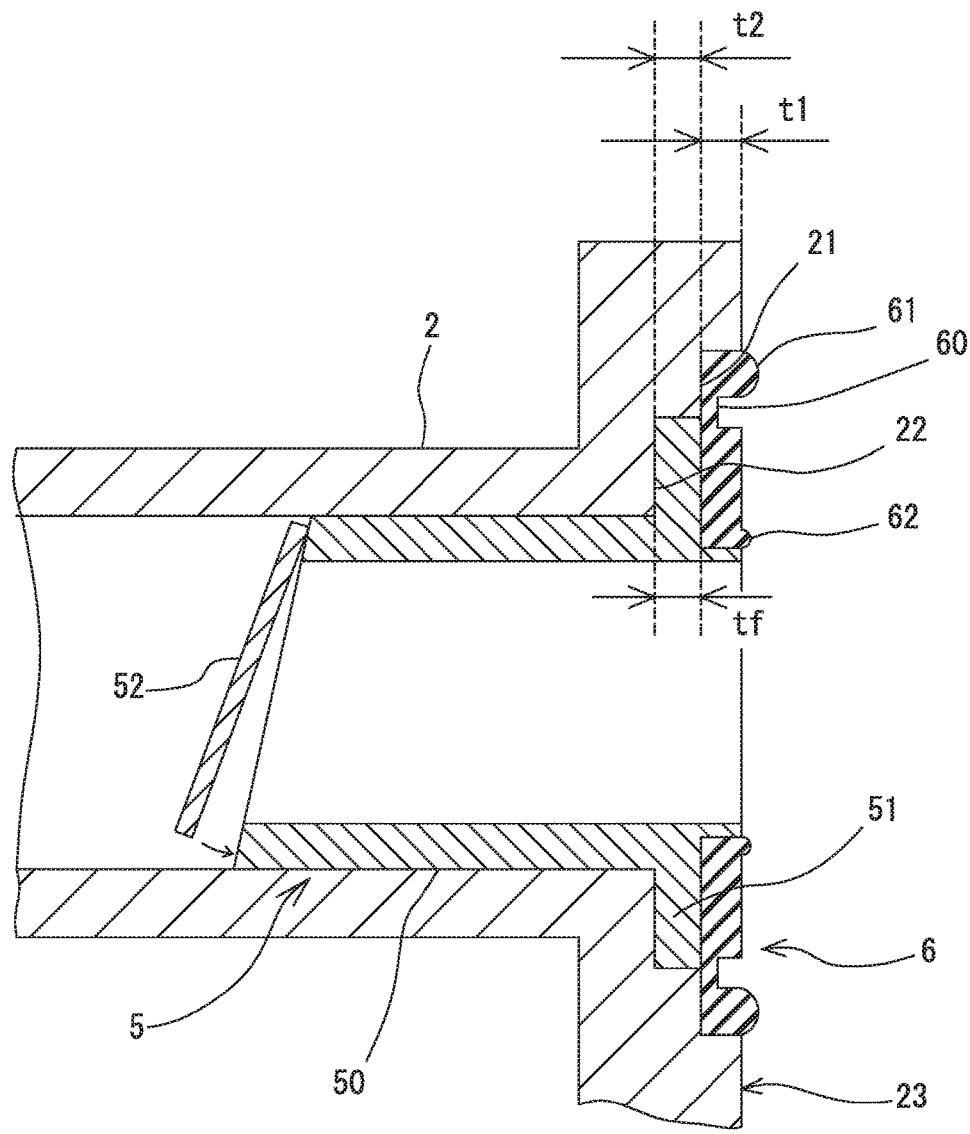
FIG. 3 is a partial enlarged cross-sectional view showing the water heater according to the first embodiment of the present invention.

As shown in FIG. 3, the annular packing (6) has a size and a shape exactly fitted into a first step portion (21) being continuous with the upstream side of the second step portion (22) in the second connection end surface (23) of the second passage (2) and extending outward beyond the second step portion (22).

Further, the annular packing (6) includes an annular outer rib (61) projecting in a thickness direction of the annular packing (6) (in the upstream direction) along the entire outer circumferential edge on an upstream end surface facing the first connection end surface (13) of the fan casing (10). Furthermore, the annular packing (6) includes an annular groove (60) recessed in the downstream direction along an inner base end portion of the outer rib (61). Moreover, the annular packing (6) includes an annular inner rib (62) being lower than the outer rib (61) and projecting in the same direction as the outer rib (61) along the entire inner circumferential edge.

As described above, the outer first step portion (21) and the inner second step portion (22) continuing inward therefrom are formed in a two-tiered structure at the substantially rectangular open end (2a) in the second connection end surface (23) of the second passage (2). As shown in FIG. 3, a depth (t2) from the second step portion (22) to the first step portion (21) is set to be substantially equal to a thickness (tf) of the flange portion (51) of the check valve (5). A depth (t1) from the second connection end surface (23) to the first step portion (21) is set to be substantially equal to a thickness of the annular packing (6) between the outer circumferential edge and the inner circumferential edge.

According to the first embodiment, when the casing body (50) of the check valve (5) is inserted in the second passage (2) from the substantially rectangular open end (2a) of the second passage (2) in such an orientation that the flap (52) is located on the downstream side, the flange portion (51) comes into contact with the second step portion (22). Thereby, the check valve (5) is positioned in the second passage (2). At this time, the flange portion (51) is substantially closely fitted into the second step portion (22). Further, an upstream end surface of the flange portion (51) and the first step portion (21) form a substantially flat and continuous plane.

The annular packing (6) is then fitted into the first step portion (21). Since the upstream end surface of the flange portion (51) and the first step portion (21) form the substantially flat and continuous plane, when the annular packing (6) is fitted into the first step portion (21), a downstream surface of the annular packing (6) comes in contact with the first step portion (21) and the upstream end surface of the flange portion (51) to maintain the airtightness. On the other hand, the outer rib (61) and the inner rib (62) project from an upstream surface of the annular packing (6).

Figure 4:
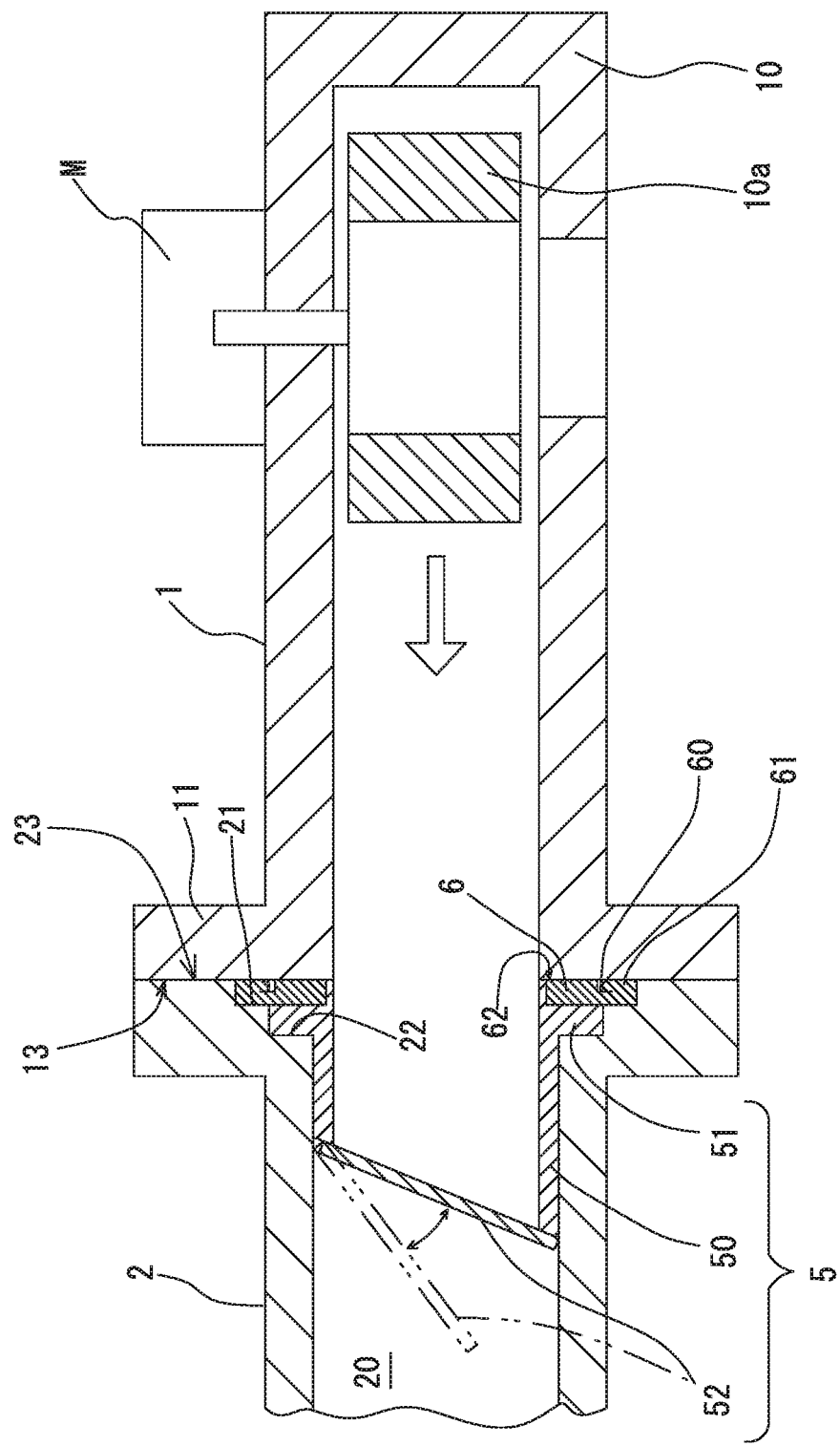
FIG. 4 is a partial enlarged cross-sectional view showing a connection state of passages in the water heater according to the first embodiment of the present invention.

While the flange portion (51) of the check valve (5) and the annular packing (6) are fitted respectively into the second step portion (22) and the first step portion (21) formed in the second connection end surface (23) of the second passage (2) as described above, the first connection end surface (13) of the flange (11) of the first passage (1) in the fan casing (10) is connected with the second connection end surface (23) of the second passage (2) by using a coupling member (not shown) as illustrated in FIG. 4. The annular packing (6) is thereby sandwiched between the first connection end surface (13) and the first step portion (21) in the second connection end surface (23) and the upstream end surface of the flange portion (51) of the check valve (5) continuing with the first step portion (21) in a substantially coplanar manner.

At this time, the outer rib (61) of the annular packing (6) is compressed and deformed by the first connection end surface (13) and a deformed portion is received by the annular groove (60) formed along the inner base end portion of the outer rib (61). Thereby, the annular packing (6) is uniformly compressed by the first connection end surface (13), so that a gap between the first connection end surface (13) and the second connection end surface (23) can be securely sealed in an airtight state by the annular packing (6).

Further, since the annular packing (6) has the size in such a manner that the outer circumferential edge is located outside the periphery of the flange portion (51) of the check valve (5), it makes possible to prevent leakage from a gap between the periphery surface of the flange portion (51) and a circumferential surface of the first step portion (21).

Further, since the annular inner rib (62) is formed along the inner circumferential edge of the annular packing (6), even in a case where the acid vapor that has flown back from the vessel (20) via the second passage (2) passes through a gap between the outer surface of the casing body (50) of the check valve (5) and an inner surface of the second passage (2) and further flows upstream of the flange portion (51) of the check valve (5), it can be dammed by the inner rib (62). Thereby, ingress of the acid vapor into the first passage (1) and the check valve (5) can be surely prevented.

Figure 5:
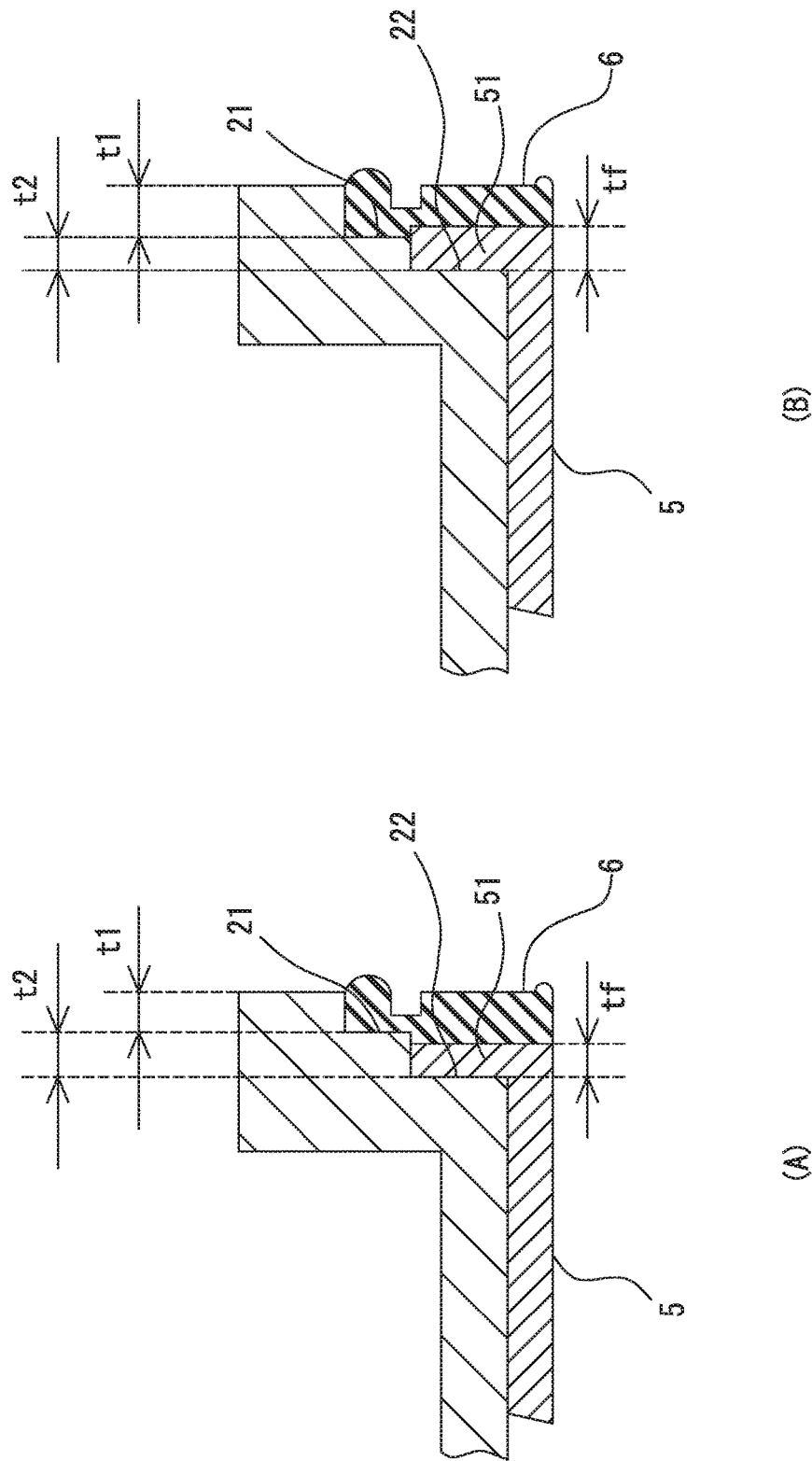
FIG. 5(A) is a partial enlarged cross-sectional view showing a connection state of passages in a water heater according to a second embodiment of the present invention and FIG. 5(B) is a partial enlarged cross-sectional view showing a connection state of passages in a water heater according to a third embodiment of the present invention.

FIG. 5 is partial enlarged cross-sectional views showing second and third embodiments. In the first embodiment described above, the flange portion (51) of the check valve (5) has the thickness (tf) substantially equal to the depth (t2) from the second step portion (22) to the first step portion (21). However, a flange portion (51) may have a thickness (tf) thinner than a depth (t2) from a second step portion (22) to a first step portion (21) as shown FIG. 5(A) or a thickness (tf) thicker than a depth (t2) as shown in FIG. 5(B). In the case of FIG. 5(A), an annular packing (6) is formed in such a manner that a part facing the flange portion (51) between an outer circumferential edge and an inner circumferential edge has a thickness obtained by adding a depth (t1) of the first step portion (21) and a difference (t2−tf) between the depth (t2) from the second step portion (22) to the first step portion (21) and the thickness (tf) of the flange portion (51). In the case of FIG. 5(B), an annular packing (6) is formed in such a manner that a part facing the flange portion (51) between an outer circumferential edge and an inner circumferential edge has a thickness obtained by subtracting a difference (tf−t2) between the thickness (tf) of the flange portion (51) and the depth (t2) from a second step portion (22) to a first step portion (21) from a depth (t1) of a first step portion (21).

Figure 6:
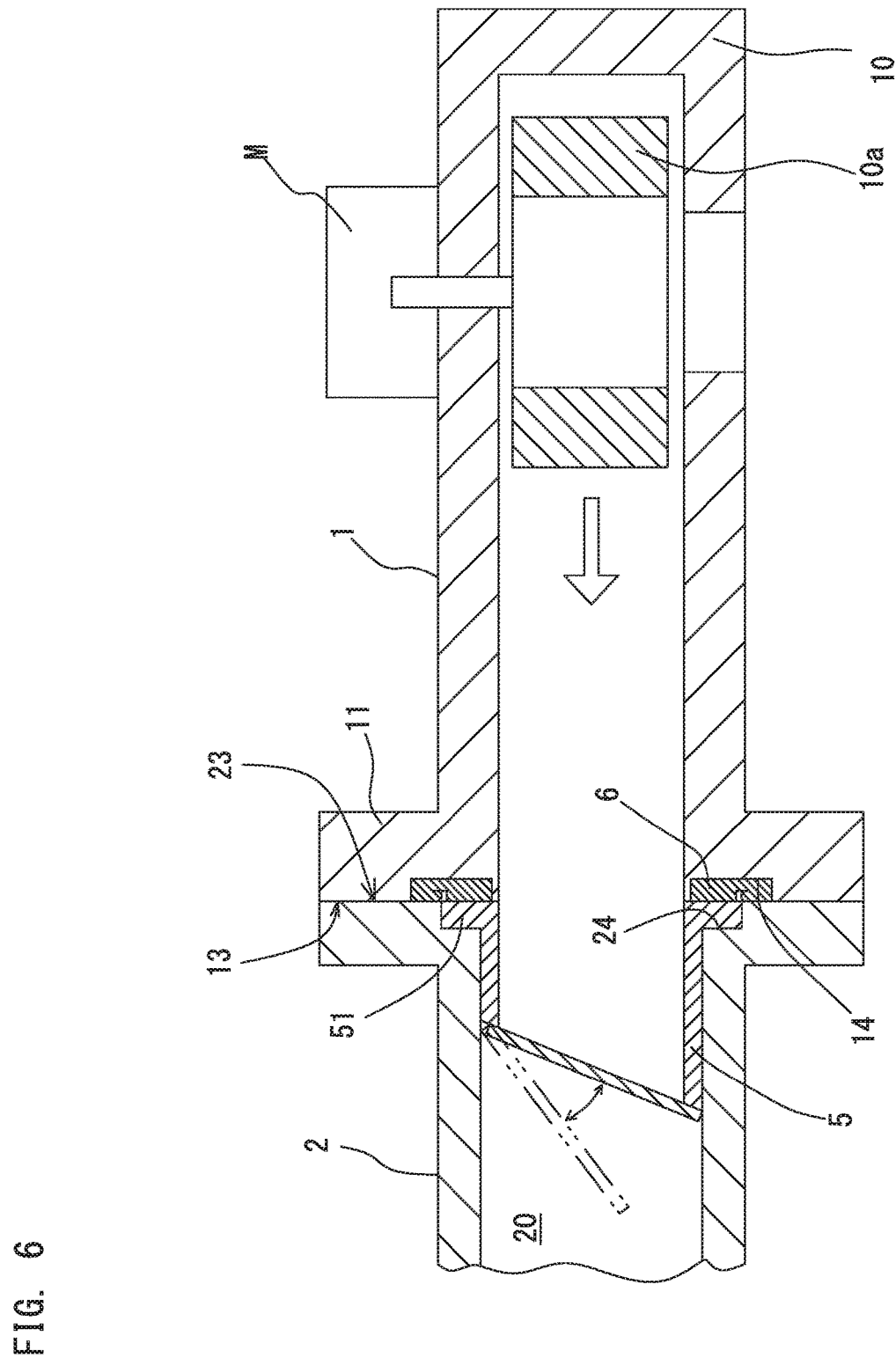
FIG. 6 is a partial enlarged cross-sectional view showing a connection state of passages in a water heater according to a forth embodiment of the present invention.

FIG. 6 is a partial enlarged cross-sectional view showing a forth embodiment. As shown in FIG. 6, a first step portion (14) into which an annular packing (6) is fitted is formed in a first connection end surface (13) of a flange (11) of a first passage (1). Thus, a second step portion (24) into which a flange portion (51) of a check valve (5) is fitted is only formed in a second connection end surface (23) of a second passage (2). In this embodiment, the first step portion (14) has a thickness substantially equal to a thickness of the annular packing (6) and the second step portion (24) has a thickness substantially equal to a thickness of the flange portion (51).

Figure 7:
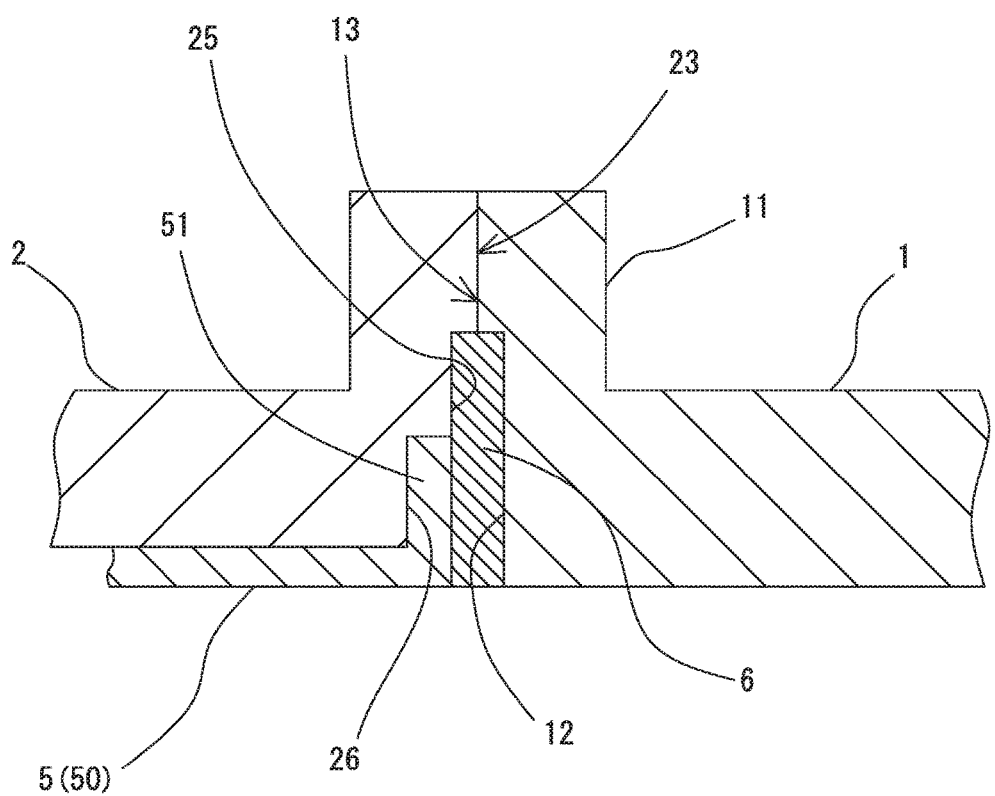
FIG. 7 is a partial enlarged cross-sectional view showing a connection state of passages in a water heater according to a fifth embodiment of the present invention.

FIG. 7 is a partial enlarged cross-sectional view showing a fifth embodiment. As shown in FIG. 7, a shallow downstream first step portion (25) is formed in a second connection end surface (23) of a second passage (2). Further, a shallow upstream first step portion (12) is formed in a first connection end surface (13) of a first passage (1) facing the downstream first step portion (25). Thus, an annular packing (6) is fitted between those two first step portions (12) and (25). In this embodiment, the upstream and downstream first step portions (12) and (25) are formed in such a manner that a depth obtained by adding a depth of the upstream first step portion (12) and a depth of the downstream first step portion (25) is substantially equal to a thickness of the annular packing (6).

Figure 8:
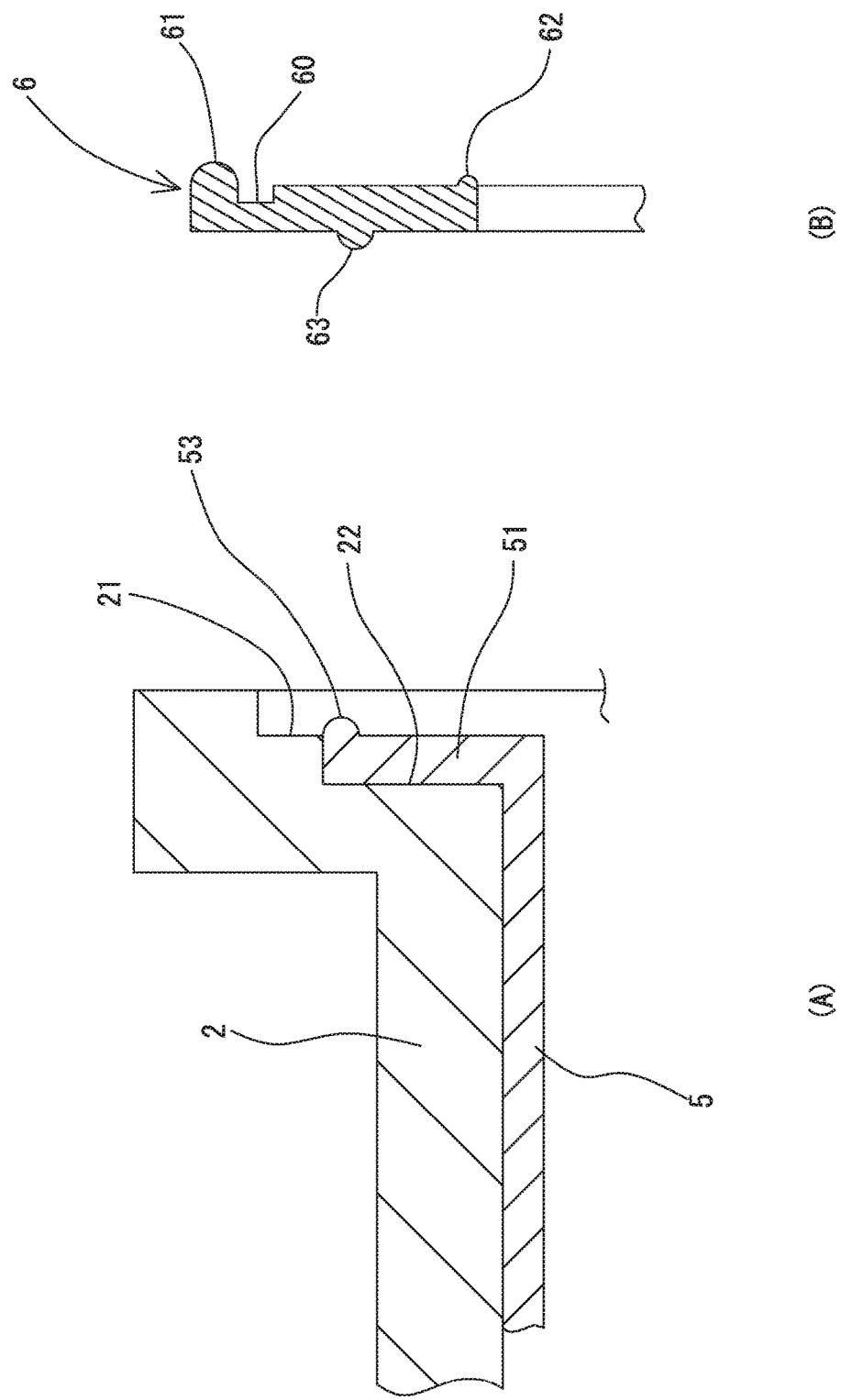
FIG. 8(A) is a partial enlarged cross-sectional view showing a connection state of passages in a water heater according to a sixth embodiment of the present invention and FIG. 8(B) is a partial enlarged cross-sectional view showing a connection state of passages in a water heater according to a seventh embodiment of the present invention.
Figure 9:
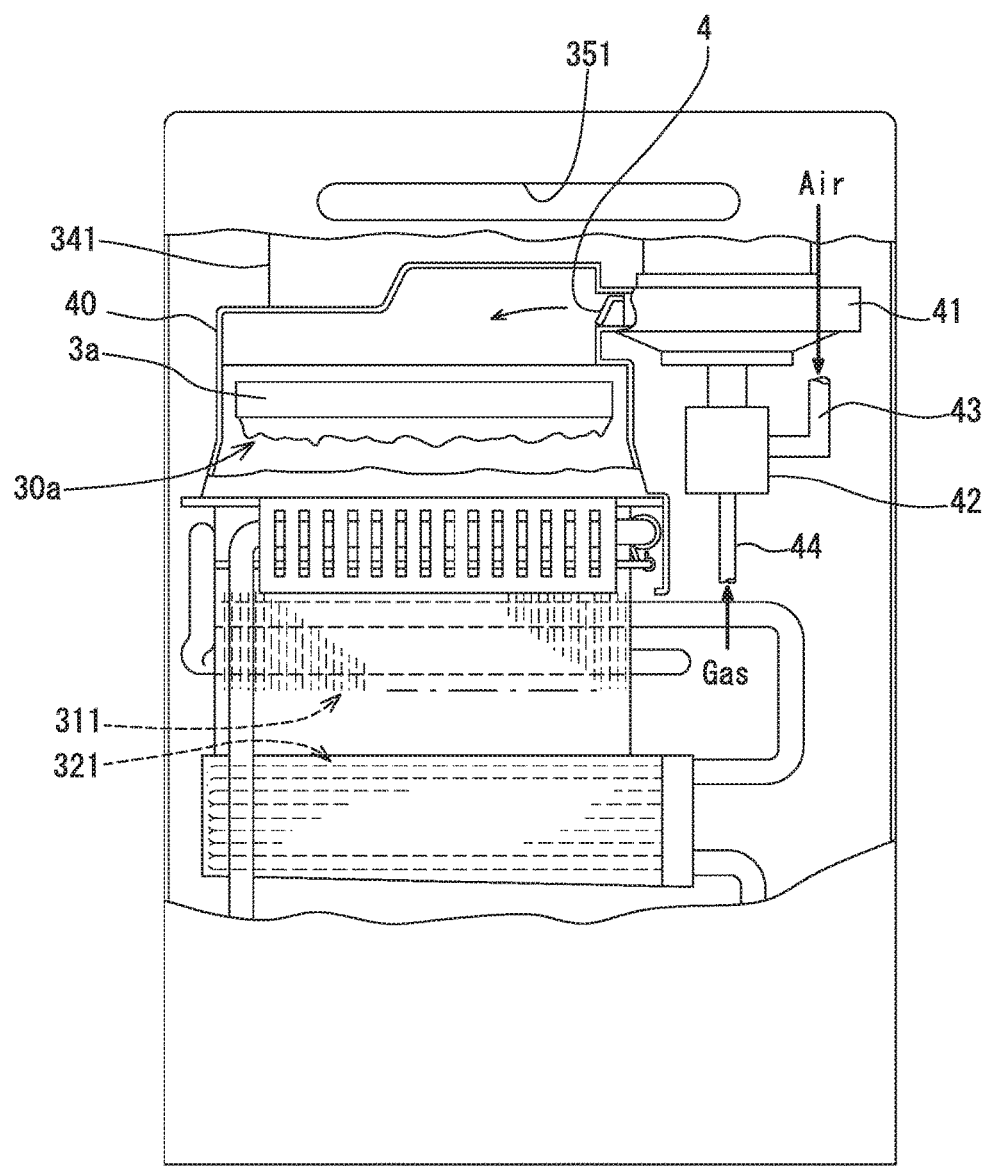
FIG. 9 is a schematic view showing a conventional water heater.
Figure 10:
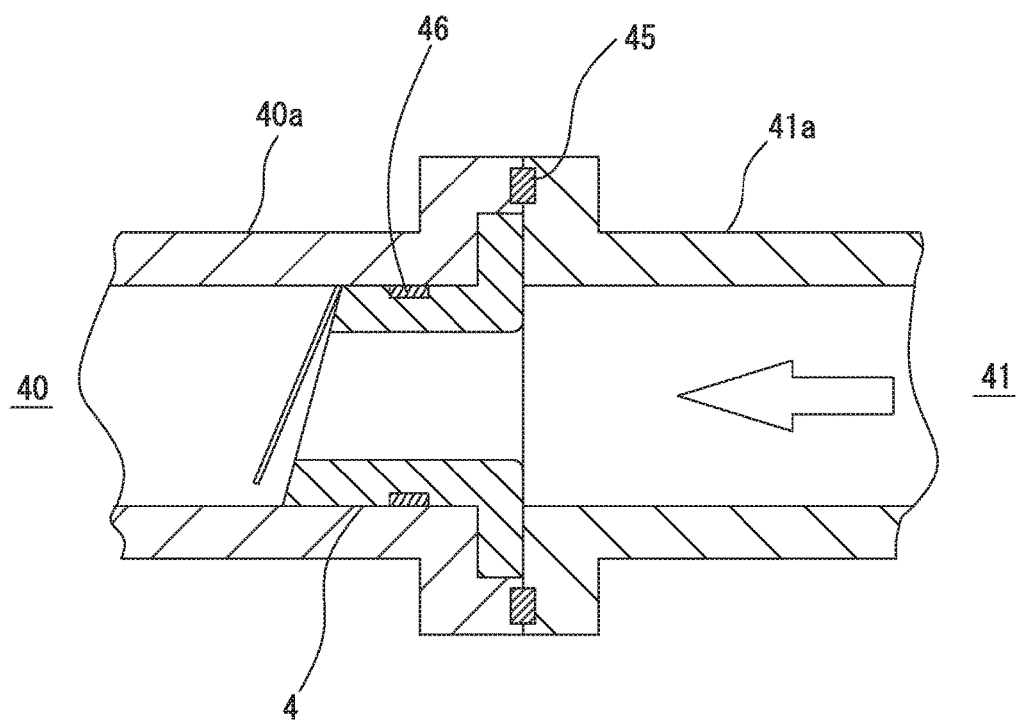
FIG. 10 is a partial enlarged cross-sectional view showing a connection state of passages in the conventional water heater.

FIG. 8 is partial enlarged cross-sectional views showing sixth and seventh embodiments. As shown in FIG. 8(A), a check valve (5) has an annular ridge (53) projecting in the upstream direction along an outer circumferential edge of an upstream end surface of a flange portion (51). Thereby, airtightness between the flange portion (51) and an annular packing (6) can be enhanced. Further, strength of the flange portion (51) can be increased by forming the annular ridge (53) on the flange portion (51).

As shown in FIG. 8(B), an annular packing (6) may have an annular ridge (63) projecting in the downstream direction from a predetermined portion of a downstream end surface facing the flange portion (51).

As described in the above embodiments, when the check valve (5) is accommodated in the second passage (2) of the vessel (20), the single annular packing (6) ensures not only the airtightness between the first connection end surface (13) of the first passage (1) and the second connection end surface (23) of the second passage (2) but also the airtightness between the inner surface of the second passage (2) and the outer surface of the casing body (50) of the check valve (5) and further the airtightness between the periphery surface of the flange portion (51) of the check valve (5) and a circumferential surface of the second step portion (22). Therefore, according to the above embodiments, there can be provided the water heater including a smaller number of components and being easier to assemble and more cost-effective than a water heater including two sealing members of a packing for maintaining the airtightness between the first connection end surface (13) and the second connection end surface (23) and an O-ring for maintaining the airtightness between the outer surface of the casing body (50) of the check valve (5) and the inner surface of the second passage (2).

Further, since the O-ring is not disposed on the outer surface of the casing body (50) of the check valve (5), the second passage (2) can be widened by the size of the O-ring. Thus, since flow resistance of the passage decreases, the fan (10a) can smoothly supply the mixture gas from the mixing device (33) to the burner (3) in the vessel (20).

In the meantime, the acid vapor ascending in the vessel (20) after the combustion of the burner (3) is turned off is stopped by the flap (52) of the check valve (5). Thereby, the acid vapor can be prevented from flowing beyond the check valve (5) and flowing back from the first passage (1) to the fan casing (10) or the mixing device (33). Therefore, rust of the fan (10a) in the fan casing (10) and the mixing device can be prevented. Further, since the acid vapor that has passed through the gap between the outer surface of the casing body (50) of the check valve (5) and the inner surface of the second passage (2) can be doubly dammed by the outer and inner ribs (61) and (62) of the annular packing (6), the backflow of the acid vapor can be surely prevented.

Further, even if outer air enters from the exhaust duct (34) to the water heater, air flow to upstream of the vessel (20) can be stopped by the check valve (5). Therefore, freezing of the heat exchangers (31) and (32) can be prevented.

As described in detail, the present invention is summarized as follows.

According to one aspect of the present invention, there is provided a water heater, comprising:

a vessel provided with a burner having a downward combustion surface;

a fan casing accommodating a fan for supplying a mixture gas of primary combustion air and fuel gas to the burner, the fan casing being in communication with the vessel;

an annular packing connecting a first connection end surface at a downstream end of a first passage forming a downstream-side passage of the fan casing with a second connection end surface at an upstream end of a second passage forming a upstream-side passage of the vessel in airtight state; and a check valve disposed near the upstream end in the second passage, wherein the check valve includes a flange portion extending outward around an entire circumference of an upstream open end thereof, at least one of the first connection end surface and the second connection end surface includes a first step portion configured to allow the annular packing to be fitted thereinto, the second connection end surface includes a second step portion configured to allow the flange portion of the check valve to be fitted thereinto, and the annular packing has an outer circumferential edge larger than a periphery of the flange portion of the check valve and an inner circumferential edge smaller than the periphery of the flange portion.

According to the water heater described above, the mixture gas is produced by mixing all air as the primary combustion air taken in from the outside by the fan and the fuel gas and the mixture gas is supplied from the fan casing to the all primary air combustion type burner in the vessel via the first and second passages. Further, the annular packing and the check valve are provided in a connected portion of the first passage and the second passage.

In the water heater described above, when the check valve is inserted from the upstream end of the second passage, the flange portion of the check valve is fitted into the second step portion of the second connection end surface of the second passage. Thereby, since it is possible to prevent the check valve from inadvertently lodging in a deeper position than a predetermined position in the second passage, the check valve is properly disposed in the vicinity of the open end of the second passage.

Further, in the water heater described above, the annular packing is fitted into at least one of the first connection end surface of the first passage and the second connection end surface of the second passage.

The annular packing has the outer circumferential edge larger than the periphery of the flange portion and the inner circumferential edge smaller than the periphery of the flange portion. Further, when the first step portion is provided in the second connection end surface of the second passage, there is provided the second step portion and the first step portion having an outer circumference larger than the second step portion on the upstream side of the second step portion. Therefore, the second connection end surface has a two-tiered structure in which the second step portion opens into the first step portion.

In the meantime, the first step portion may be formed in the first connection end surface. In this case, the first step portion may be a step portion open into the first passage at an inner side thereof or an annular groove into which the annular packing can be fitted.

Also, the first step portion may be shallowly formed in opposite sides of the first connection end surface of the first passage and the second connection end surface of the second passage in such a manner that front and back surfaces of the annular packing respectively are fitted into the first connection end surface and the second connection end surface with a predetermined depth.

In the water heater described above, when the first connection end surface of the first passage and the second connection end surface of the second passage are connected while the check valve is inserted in the second passage to fit the flange portion into the second step portion and the annular packing is fitted into the first step portion, the compressed annular packing is interposed between the first connection end surface and the second connection end surface. Thereby, the airtightness between the connection end surfaces can be maintained. Further, the annular packing is compressed between the periphery of the flange portion and a circumferential surface of the second step portion. Accordingly, the single annular packing can prevent not only the leakage from the gap between the first connection end surface and the second connection end surface but also the leakage from the gap between the second passage and the check valve. Further, since no O-ring is fitted onto the outer surface of the check valve, the second passage is not narrowed by the O-ring.

Preferably, in the water heater described above, the annular packing has an annular outer rib projecting along the entire outer circumferential edge in a thickness direction of the annular packing and an annular groove recessed along an inner base end portion of the outer rib in the thickness direction of the annular packing.

When the first passage and the second passage are connected, the annular outer rib of the annular packing is compressed and deformed between the first connection end surface and the second connection surface. At this time, since the annular groove is formed along the inner base end portion of the outer rib of the annular packing, deformation of the outer rib can be released through the annular groove formed along the inner base end portion of the outer rib, whereby the deformation can be absorbed in the annular groove. Thereby, size variations of various parts and the deformation are reduced and the airtightness between the first connection end surface and the second connection end surface is further improved.

Preferably, in the water heater described above, the annular packing has an annular inner rib projecting along the entire inner circumferential edge in the thickness direction of the annular packing.

According to the water heater described above, the airtightness between the upstream end surface of the flange portion of the check valve and the first connection end surface of the first passage opposed thereto is further improved by the annular inner rib. Accordingly, the acid vapor flowing back from the vessel via the second passage is unlikely to leak into the check valve and the first passage through the outer surface of the check valve and the flange portion.

Preferably, in the water heater described above, at least one of an upstream end surface of the flange portion and a portion of the annular packing facing the flange portion has an annular ridge.

According to the water heater described above, when the first connection end surface of the first passage and the second connection end surface of the second passage are connected through the annular packing, the flange portion comes into press contact with the annular packing through the annular ridge. Thereby, the airtightness between the flange portion and the annular packing is further improved. Moreover, strength of the flange portion is increased by providing the annular ridge on the flange portion.

Preferably, in the water heater described above, the flange portion has a thickness substantially equal to a depth of the second step portion.

According to the water heater described above, when the flange portion is fitted into the second step portion, the upstream end surface of the flange portion is located at substantially the same level of an open end of the second step portion. Thereby, the flange portion and the first step portion come into pressure contact with the annular packing at the substantially same level. Accordingly, since a seal surface of the annular packing is unlikely to partially deform due to compression at the connecting time, sealing property is highly improved.

Although the present invention has been described hereinabove with reference to exemplary embodiments, the present invention is not limited thereto. The configuration and details of the present invention are open to various modifications within the scope of the present invention that would be clear to those skilled in the art.

INDUSTRIAL APPLICABILITY

According to the present invention, there is provided the water heater which is assembled easily with a small number of components and is excellent in the airtightness between the fan casing and the vessel.

The invention claimed is:

1. A water heater, comprising:
    a vessel provided with a burner having a downward combustion surface;
    a fan casing accommodating a fan for supplying a mixture gas of primary combustion air and fuel gas to the burner, the fan casing being in communication with the vessel;
    an annular packing connecting a first connection end surface at a downstream end of a first passage forming a downstream-side passage of the fan casing with a second connection end surface at an upstream end of a second passage forming an upstream-side passage of the vessel in an airtight state; and
    a check valve disposed near the upstream end in the second passage, wherein
        the check valve includes a flange portion extending outward around an entire circumference of an upstream open end thereof,
        at least one of the first connection end surface and the second connection end surface includes a first step portion configured to allow the annular packing to be fitted thereinto,
        the second connection end surface includes a second step portion configured to allow the flange portion of the check valve to be fitted thereinto, and
        the annular packing has an outer circumferential edge larger than a periphery of the flange portion of the check valve and an inner circumferential edge smaller than the periphery of the flange portion.

2. The water heater according to claim 1, wherein the annular packing has an annular outer rib projecting along the entire outer circumferential edge in a thickness direction of the annular packing and an annular groove recessed along an inner base end portion of the outer rib in the thickness direction of the annular packing.

3. The water heater according to claim 1, wherein the annular packing has an annular inner rib projecting along the entire inner circumferential edge in a thickness direction of the annular packing.

4. The water heater according to claim 1, wherein at least one of an upstream end surface of the flange portion and a portion of the annular packing facing the flange portion has an annular ridge.

5. The water heater according to claim 1, wherein the flange portion has a thickness substantially equal to a depth of the second step portion.

6. The water heater according to claim 2, wherein the annular packing has an annular inner rib projecting along the entire inner circumferential edge in the thickness direction of the annular packing.

7. The water heater according to claim 2, wherein at least one of an upstream end surface of the flange portion and a portion of the annular packing facing the flange portion has an annular ridge.

8. The water heater according to claim 2, wherein the flange portion has a thickness substantially equal to a depth of the second step portion.

9. The water heater according to claim 3, wherein at least one of an upstream end surface of the flange portion and a portion of the annular packing facing the flange portion has an annular ridge.

10. The water heater according to claim 3, wherein the flange portion has a thickness substantially equal to a depth of the second step portion.

* * * * *